United States Patent
Zhu et al.

(10) Patent No.: US 6,221,933 B1
(45) Date of Patent: Apr. 24, 2001

(54) FAST DRYING JET INK COMPOSITION

(75) Inventors: Linfang Zhu, Naperville; John P. Folkers, Arlington Heights; Mark A. Chamerlik, Elk Grove Village; Renita J. Freeze, Palatine, all of IL (US)

(73) Assignee: Marconi Data Systems Inc., Wood Dale, IL (US)

( * ) Notice: Subject to any disclaimer, the term of this patent is extended or adjusted under 35 U.S.C. 154(b) by 0 days.

(21) Appl. No.: 09/283,164

(22) Filed: Apr. 1, 1999

Related U.S. Application Data

(63) Continuation-in-part of application No. 09/032,612, filed on Feb. 27, 1998, now abandoned.

(51) Int. Cl.[7] .............................. C09D 11/10; C08L 33/08; C08L 33/10; C08L 79/02; C08F 8/32
(52) U.S. Cl. ........................ 523/160; 525/217; 525/221; 525/381
(58) Field of Search .................................. 523/160, 161; 106/31.13, 31.27, 31.29, 31.43, 31.57, 31.95; 525/329.9, 381, 217, 218, 221

(56) References Cited

U.S. PATENT DOCUMENTS

| | | |
|---|---|---|
| 3,060,429 | 10/1962 | Winston . |
| 3,298,030 | 1/1967 | Lewis et al. . |
| 3,373,437 | 3/1968 | Sweet et al. . |
| 3,416,153 | 12/1968 | Hertz et al. . |
| 3,673,601 | 6/1972 | Hertz . |
| 4,024,096 | 5/1977 | Wachtel . |
| 4,045,397 | 8/1977 | Parkinson . |
| 4,155,768 | 5/1979 | Adams et al. . |
| 4,197,135 | 4/1980 | Bailey et al. . |
| 4,507,466 | 3/1985 | Tomalia et al. . |
| 4,558,120 | 12/1985 | Tomalia et al. . |
| 4,567,213 | 1/1986 | Bhatia et al. . |
| 4,568,737 | 2/1986 | Tomalia et al. . |
| 4,587,329 | 5/1986 | Tomalia et al. . |
| 4,631,337 | 12/1986 | Tomalia et al. . |
| 4,680,332 | 7/1987 | Hair et al. . |
| 4,692,188 | 9/1987 | Ober et al. . |
| 4,789,400 | 12/1988 | Solodar et al. . |
| 4,834,799 | 5/1989 | Song . |
| 5,080,716 | 1/1992 | Aoki et al. . |
| 5,098,475 | 3/1992 | Winnik et al. . |
| 5,100,470 | 3/1992 | Hindagolla et al. . |
| 5,116,409 | 5/1992 | Moffatt . |
| 5,120,361 | 6/1992 | Winnik et al. . |
| 5,131,949 | 7/1992 | Tochihara et al. . |
| 5,178,671 | 1/1993 | Yamamoto et al. . |
| 5,207,825 | 5/1993 | Schwarz, Jr. . |
| 5,213,613 | 5/1993 | Nagashima et al. . |
| 5,215,577 | 6/1993 | Eida et al. . |
| 5,223,028 | 6/1993 | Aulick et al. . |
| 5,244,496 | 9/1993 | Easton et al. . |
| 5,254,158 | 10/1993 | Breton et al. . |
| 5,254,159 | 10/1993 | Gundlach et al. . |
| 5,256,193 | 10/1993 | Winnik et al. . |
| 5,266,106 | 11/1993 | Winnik et al. . |
| 5,275,647 | 1/1994 | Winnik . |
| 5,300,143 | 4/1994 | Schwarz, Jr. . |
| 5,302,631 | 4/1994 | Yamada et al. . |
| 5,316,575 | 5/1994 | Lent et al. . |
| 5,360,472 | 11/1994 | Radigan et al. . |
| 5,596,027 | 1/1997 | Mead et al. . |
| 5,652,286 | 7/1997 | Deng . |
| 5,693,127 | * 12/1997 | Nigam et al. ......................... 524/88 |
| 5,744,519 | 4/1998 | Heraud et al. ....................... 523/160 |
| 5,849,815 | 12/1998 | Aoki et al. . |
| 5,889,083 | * 3/1999 | Zhu ...................................... 523/161 |
| 5,889,084 | * 3/1999 | Roth .................................... 523/161 |
| 5,939,468 | * 8/1999 | Siddiqui .............................. 523/161 |

FOREIGN PATENT DOCUMENTS

| | | |
|---|---|---|
| 0 731 149 | 9/1996 | (EP) . |
| 2105735 | 3/1983 | (GB) . |

OTHER PUBLICATIONS

Kuhn et al., "Ink Jet Printing", *Scientific American*, pp. 162–178, Apr. 1979.

Keeling, "Ink Jet Printing", *Phys. Technol.*, 12(5), pp. 196–303, 1981.

Hawker et al., "Preparation of Polymers with Controlled Molecular Architecture. A New Convergent Approach to Dendritic Macromolecules", *J. Am. Chem. Soc.*, 112, pp. 7638–7647, 1990.

Tomalia et al., "Starburst Dendrimers: Molecular–Level Control of Size, Shape, Surface Chemistry, Topology, and Flexibility from Atoms to Macroscopic Matter", *Agnew, Chem. Int. Ed. Engl.*, 29, pp. 138–175, 1990.

* cited by examiner

Primary Examiner—Vasu Jagannathan
Assistant Examiner—Callie E. Shosho
(74) Attorney, Agent, or Firm—Leydig, Voit, & Mayer, Ltd.

(57) ABSTRACT

The present invention provides a fast drying jet ink composition comprising an organic solvent, a colorant, a polyamine, and an acidic resin. The acidic resin preferably has an acid number of from about 10 to about 250. Examples of suitable polyamines include dendrimers and aminoacrylates. The jet ink composition can be used to print on glass surfaces that have a condensation of moisture on them. The printed messages do not easily rub off after exposure to humid conditions. The messages printed on glass can be washed off by a caustic solution.

20 Claims, No Drawings

FAST DRYING JET INK COMPOSITION

CROSS REFERENCE TO A RELATED APPLICATION

This is a continuation-in-part of U.S. patent application Ser. No. 09/032,612, filed Feb. 27, 1998 abandoned.

FIELD OF THE INVENTION

The present invention relates to a fast drying jet printing ink composition suitable for printing on glass surfaces which may be exposed to humid conditions during printing. The messages printed on glass surfaces are resistant to exposure to humid conditions.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream, e.g., electronically, so that the droplets are caused to form the desired printed message on that surface.

The technique of ink jet printing or non-contact printing is particularly well suited for application of characters onto irregularly shaped surfaces, including, for example, glass, metal, or plastic containers, generally used for holding beverage, cosmetic, pharmaceutical, liquor, and health care products.

Reviews of various aspects of ink jet printing can be found in the following publications: Kuhn et al., *Scientific American*, April, 1979, 162–178; and Keeling, *Phys. Technol.*, 12(5), 196–303 (1981). Various ink jet apparatuses are described in the following U.S. Pat. Nos.: 3,060,429, 3,298,030, 3,373,437, 3,416,153, and 3,673,601.

In general, an ink jet ink composition must meet certain rigid requirements to be useful in ink jet printing operations. These relate to viscosity, resistivity, solubility, compatibility of components and wettability of the substrate. Further, the ink must be quick-drying and smear resistant, resist rubbing, and be capable of passing through the ink jet nozzle without clogging, and permit rapid cleanup of the machine components with minimum effort.

In addition, the ink must meet certain other requirements. Many beverage manufacturers fill the containers with chilled beverages, frequently under humid conditions that promote condensation of moisture on the containers. The moisture that condenses on the container surfaces poses a severe problem in obtaining ink penetration, good adhesion, and abrasion resistance of the printed messages. Thus, the jet ink should allow printing on these containers in the presence of the condensation, and the printed messages should not be damaged by the condensation. Further, when the containers are immersed in ice water for chilling, the messages should not disintegrate or be damaged by the ice water. Moreover, the bottles may be exposed to warm and humid conditions during warehousing and shipping to different parts of the world and in different seasons. The messages should not be damaged by the hot and cold humid conditions. Further, the messages should be removable by a caustic wash in order to allow reuse of the returned glass bottles.

Many of the known ink jet ink compositions are not suitable for printing on glass under humid conditions, or do not provide water resistant printed messages on glass surfaces. Only a few ink compositions are reported to be suitable for printing on glass surfaces under humid conditions. For example, U.S. Pat. No. 5,693,127 discloses a jet ink comprising a binder, a colorant, a liquid vehicle and an adhesion promoter which is an alkoxysilyl polyalkylene-imine. Although the patent states that the ink is suitable for printing on glass bottles having a condensation thereon, certain difficulties are encountered in following its teachings. For example, the alkoxysilyl polyalkylene-imine adhesion promoter does not appear to be commercially available, and the patent does not teach those of ordinary skill in the art how to make this adhesion promoter. Further, the stability of the ink composition containing alkoxysilylated polyalkylene-imines remains uncertain.

U.S. Pat. No. 5,596,027 discloses an ink jet ink composition comprising an ink carrier, a colorant, a polyamine, and an acidic resin. This ink composition is capable of producing condensation and moisture resistance images on glass bottles. Although the claims are directed to solvent-based as well as water-based ink compositions, the patent does not suggest ways of producing ink compositions having the combination of specific advantages, namely, the short drying time, condensation resistance, rub resistance, and alkali washability. It is known that water-based inks take a relatively long time to dry on glass substrates. Drying times greater than 10 seconds may be necessary with water-based inks.

Thus, there exists a need for a jet ink composition meeting certain critical performance requirements. There exists a need for a fast drying jet ink composition that provides high quality messages on container surfaces, especially glass surfaces. There exists a need for a jet ink composition which can be printed on glass surfaces which may have moisture condensation on them. There exists a need for a jet ink composition whose printed messages do not smear, rub off, or otherwise degrade after exposure to ice water. Further, there exists a need for a jet ink composition whose printed messages do not smear, rub off, or otherwise degrade after exposure to hot and cold humid conditions. There further exists a need for a jet ink composition whose printed messages on glass surfaces can be washed off by a caustic solution.

It is therefore an object of the present invention to provide a jet ink composition that provides high quality messages on various surfaces, particularly glass surfaces which may have a condensation of moisture on them. It is a further object of the present invention to provide a jet ink composition whose printed messages do not smear, rub off, or otherwise degrade when exposed to hot and cold humid conditions. It is also an object of the present invention to provide a jet ink composition whose printed messages do not smear, rub off, or otherwise degrade when exposed to ice water. It is a further object of the present invention to provide a jet ink composition whose messages on glass surfaces can be washed off readily using a caustic solution.

BRIEF SUMMARY OF THE INVENTION

The foregoing needs have been fulfilled to a great extent by the present invention which provides a jet ink composition that can produce high quality messages on various surfaces. The jet ink composition of the present invention is fast drying. The jet ink composition makes possible printing on glass surfaces which have a condensation of moisture thereon. The present invention further provides a jet ink composition whose printed messages on glass do not smear or rub off after exposure to humid conditions. The present invention further provides a jet ink composition whose printed messages do not smear or rub off after exposure to ice water. The present invention further provides a jet ink composition whose messages printed on glass can be washed off by a caustic solution.

The present invention provides a jet ink composition comprising an organic solvent, a colorant, a polyamine, and an acidic resin. The polyamine is preferably free or substantially free of alkoxysilyl groups. The present invention further provides a jet ink composition comprising an organic solvent, a colorant, an acidic resin, and a polyamine selected from the group consisting of a polyalkyleneamine, an aminoacrylic polymer, and a dendrimer.

The colorant used in the ink composition of the present invention includes a dye or a pigment. The ink composition of the present invention may additionally include surfactants, humectants, plasticizers, defoamers, adhesion promoters, and electrolytes.

The present invention further provides an improved process of jet printing on glass surfaces messages having condensation and water resistance, the improvement comprising printing with the ink composition of the present invention in the jet printing process.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides a jet ink composition comprising an organic solvent, a colorant, a polyamine, and an acidic resin. The present inventors have found a way for producing an ink composition that combines several advantages. Thus, they have produced ink compositions having short dry times and condensation resistance. The messages produced from these ink compositions have rub resistance, ice water resistance, and alkali washability.

Heretofore workers in the art have attempted to prepare solvent based ink jet ink compositions in an effort to reduce the ink dry times and at the same time retain condensation and moisture resistance; however, the have failed to prepare stable ink compositions containing an organic solvent, a polyamine, and an acidic resin. In view of the foregoing, it is generally believed in the industry that an ink composition that includes an organic solvent, a polyamine, and an acidic resin would be unstable. It is also believed that the instability is due to the gel formation resulting from the excessive ionic interaction between the polyamine and the acidic resin. The use of a mono amine such as ammonium hydroxide in the preparation of the ink composition to improve ink stability results in an ink having a reduced initial adhesion to the substrate.

Contrary to the belief of others in the industry, it has been surprisingly found by the present inventors that a stable ink composition comprising an organic solvent, a polyamine, and an acidic resin can be successfully prepared. Accordingly, the present invention provides a fast drying jet ink composition that can produce high quality messages on substrate surfaces such as glass surfaces. The jet ink composition makes possible printing on glass surfaces that have a condensation of moisture thereon. The present invention also provides a jet ink composition whose printed messages on glass surfaces do not smear or rub off after exposure to ice water. The ink composition is free or substantially free of mono amines and gels.

The present invention further provides a jet ink composition whose messages do not smear or rub off after exposure to cold and hot humid conditions. The present invention further provides a jet ink composition whose messages printed on glass can be washed off by a caustic solution.

Certain embodiments of the present ink composition form messages that dissolve rather than peel off glass surfaces when exposed to a caustic solution. These embodiments are particularly suitable for printing on glass surfaces containing a coating thereon, such as a scratch resistant coating (e.g., tin oxide coated with a polyethylene wax), since the coating resists peeling of printed messages.

The ink composition of the present invention offers good initial adhesion and/or good print quality of the messages printed on wet substrates. The ink composition of the present invention also provides excellent long term printer runnability. The ink composition of the present invention offers good condensation and ice water resistance on uncoated glass substrates such as returnable bottles.

The present invention further provides a jet ink composition comprising an organic solvent, a colorant, an acidic resin, and a polyamine selected from the group consisting of a polyalkyleneamine, an aminoacrylic polymer, and a dendrimer.

The ink composition of the present invention, in general, exhibits the following characteristics for use in ink jet printing systems: (1) a viscosity of from about 1.5 centipoises (cps) to about 7 cps at 25° C.; (2) an electrical resistivity of from about 50 ohm-cm to about 2000 ohm-cm; and (3) a sonic velocity of from about 1100 meters/second to about 1700 meters/second.

The jet ink composition of the present invention has the advantage that it dries rapidly from substrate surfaces, particularly glass surfaces, which allows high-speed printing. The drying time of the jet-printed message is less than 10 seconds, preferably less than about 2 seconds, and more preferably about 1 second or less.

The colorant used in the ink composition of the present invention includes a dye or a pigment. The ink composition of the present invention may additionally include one or more binder resins, surfactants, humectants, plasticizers, electrolytes, adhesion promoters, and defoamers.

The ink composition of the present invention can be prepared by any suitable method known to those of ordinary skill in the art. For instance, the components of the composition can be combined and mixed in a suitable mixer or blender. A detailed discussion of each of the components and the characteristics of the inventive ink composition are set forth below.

Organic Solvent

Any suitable organic solvent can be used as the ink carrier of the ink composition of the present invention, and preferably a low boiling organic solvent or a mixture of such organic solvents is used as the ink carrier. Small amounts of high boiling solvents can also be employed. Examples of suitable organic solvents include ketones, alcohols, esters, ethers, and amides, and preferably lower ketones, lower alcohols, amides, and mixtures thereof. Methyl ethyl ketone, ethanol, N-methylpyrrolidone, and mixtures thereof are examples of preferred ink carriers. It is believed that certain combinations of solvents, e.g., a combination of a lower ketone, a lower alcohol, and an amide, such as a combination of methyl ethyl ketone, ethanol, and N-methylpyrrolidone, improve ink stability and inhibit gel formation or precipitation particularly when acidic resins of high acid numbers are utilized.

Any suitable amount of ink carrier can be present. Typically the carrier is present in an amount of up to about 95% by weight, preferably in an amount of from about 35% by weight to about 85% by weight, and more preferably in an amount of from about 80% by weight to about 85% by weight of the ink composition. In certain embodiments, the ink composition includes methyl ethyl ketone in an amount of from about 50% by weight to about 70% by weight, ethanol in an amount of from about 5% by weight to about 25% by weight, and N-methylpyrrolidone in an amount of up to about 5% by weight and preferably up to about 3% by weight of the ink composition.

Polyamine

The ink composition of the present invention comprises a polyamine. It is believed that the amino group of the polyamine interacts with the acidic resin to provide a durable printed message that resists condensation of moisture and/or resists smearing or damage when exposed to ice water. The interaction between the polyamine and the acidic resin has not been fully understood, and it is believed that it involves interactions such as formation of covalent, ionic, hydrogen bonding, and/or other interactions such as van der Waals interactions, dipole-dipole interactions, dipole-induced dipole interactions, or combinations thereof. An example of an ionic interaction is the formation of an ammonium carboxylate salt.

It is also believed that polyamine and the surface of the substrate interact to provide improved adhesion between the substrate surface and the components of the printed message. For example, the reactive groups, such as the amino groups of the polyamine, interact with the surface groups on the substrate.

The polyamine has at least two amino groups per molecule. It may be a small molecule such as ethylenediamine, or a polymeric molecule such as polyethyleneimine. The molecule may be linear, branched, cross-linked, or three-dimensional. Preferably, the polyamine is free or substantially free of alkoxysilyl groups.

A preferred class of polyamine is a polyalkyleneamine. Another preferred class of polyamine is an aminoacrylic polymer, for example, a copolymer of methylmethacrylate and dimethylaminoethyl methacrylate described in U.S. Pat. No. 4,834,799. Thus, methyl methacrylate/dimethylaminoethyl methacrylate 70/30 copolymer, manufactured by Aldrich, is a preferred aminoacrylic polymer. Yet another example of a preferred class of polyamines is a dendrimer.

Examples of suitable polyamines include N,N'-bis(3-aminopropyl)-1,2-ethylenediamine, 1,4-bis(3-aminopropyl) piperazine, N,N'-bis(3-aminopropyl)-1,4-butanediamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, and polyalkyleneamines such as ethylenediamine, diethylenetriamine, triethylenetetramine, tetraethylenepentamine, and pentaethylenehexamine, and mixtures thereof.

Dendrimers are radially symmetrical molecules of a STARBURST™ topology comprised of an initiator core, such as nitrogen, ethyleneimine, and the like, interior layers attached to the core and comprised of a suitable number of arms, for instance, two to four arms, each arm being comprised of repeating units with the number of repeating units in each arm being considered the generation of the dendrimer, and terminal groups functionality, such as, for example, a primary amine attached to the outmost generation, which dendrimers are illustrated, for example, in U.S. Pat. Nos. 4,507,466; 4,631,337; 4,558,120; 4,568,737; and 4,587,329; and in Tomalia et al., *Angewandte Chemie*, Int. Ed. Engl., 29, 138 (1990). The size and shape of the STARBURST dendrimer molecule and the functional groups present in the dendrimer molecule can be controlled by the choice of the initiator core, the number of generations, and the choice of repeating units employed at each generation.

The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of suitable core materials include ammonia, polyfunctional alcohols, such as pentaerythritol or tris-(hydroxymethyl) ethane, 1,1,1-tris-(4'-hydroxypheyl)ethane, polyfunctional amines, such as ethylene diamine, linear polyethyleneimines, and the like. The chemical functionality of the repeating unit in the interior layers can include, for example, amidoamines, such as aminoethyl acetamide, imines, such as diethylene diimine, or ethers like those obtained from materials such as, for example, 3,5-dihydroxyethyl benzyl alcohol. The terminal functionalities include, for example, amino groups, hydroxyl groups, carboxylic acid groups, carboxylates, esters, amides, phosphates, sulfonates, and the like.

The synthesis of dendrimers usually occurs by a divergent approach that involves the initial reaction of a monomer with the initiator core, followed by exhaustive reaction of the resulting functional groups with a difunctional compound, such as a diamine, including, for example, ethylene diamine, to afford the next generation of reactive amino groups. Thus, for example, ethylene diamine can be suitably reacted first with methyl acrylate to produce a compound such as N,N,N',N'-tetra(methoxycarbonylethyl)-ethylenediamine. The aforesaid compound can be reacted in the next step with ethylene diamine to produce an amidoamine dendrimer having a generation number of zero, a molecular weight of 517, and four primary amino groups at the surface. Repetition of the above two-step procedure leads to subsequent generations.

An alternate synthetic route uses a convergent growth synthesis as described in detail in Hawker et al., *J. Amer. Chem. Soc.*, 112, 7638 (1990).

The dendrimer may have other groups or segments, in addition to amino groups. For instance, the dendrimer may have a dye covalently attached to it, or it may have certain functional groups grafted onto it.

Preferred dendrimers for use in the preparation of the ink composition of the present invention include those having terminal amine functionality at the surface. It is further preferred that the dendrimer has a molecular weight in the range from about 300 to about 100,000, a generation number of from 0 to 10, a surface amine group concentration of from about 3 to about 4,100, and a molecular diameter of from about 10 A to about 10,000 A. It is also more preferred that the dendrimer has a molecular weight in the range from about 500 to about 5,000, a generation number of from 0 to about 2, and a surface group concentration of from about 4 to about 16. It is also preferred that the polydispersity index (Mw/Mn) of the dendrimer is low, preferably in the range of from about 1.1000 to about 1.0001, and more preferably in the range of from about 1.001 to about 1.0001. For additional details on the dendrimers, see U.S. Pat. No. 5,596,027, column 6, lines 39–62, the disclosure of which is incorporated herein by reference.

A modified dendrimer, particularly a hydrophobically modified dendrimer, is preferred. The hydrophobically modified dendrimers include an alkyl group as the modification. A long chain alkyl group, e.g., a $C_{12}$ alkyl, is preferred. A preferred dendrimer is a $C_{12}$ modified amidoamine dendrimer.

Any suitable amount of the polyamine can be used. The polyamine is used preferably in an amount of from about 0.01% by weight to about 5% by weight, and more preferably in an amount of from about 0.1% by weight to about 0.5% by weight of the ink composition. In some embodiments, the polyamine can be present in an amount of from about 1% by weight to about 1.5% by weight of the ink composition.

Colorant

The ink composition of the present invention comprises a colorant. Any suitable colorant, dye or pigment, can be used. A colorant having reduced water solubility is preferred. An example of a suitable dye is C.I. Solvent Black 29, which is available as ORASOL BLACK RLI™ from Ciba-Geigy. Solvent Black 29 is insoluble in water. It is believed that the water insolubility or reduced water solubility of colorants is at least partly responsible for the observed water resistance of the printed messages. Examples of pigments and additional examples of dyes can be found in U.S. Pat. No. 5,596,027, column 7, line 12, to column 9, line 3, the disclosure of which is incorporated herein by reference.

The colorant can be present in the ink composition in an amount required to produce the desired color intensity, contrast and readability. The colorant is present preferably in an amount of from about 1% by weight to about 10% by weight, and more preferably in an amount of from about 3% by weight to about 6% by weight of the ink composition. In certain embodiments, the colorant is preferably present in an amount of from about 8% by weight to about 15% by weight of the ink composition. In certain other embodiments, the colorant is preferably present in an amount of from about 4% by weight to about 6% by weight of the ink composition.

Acidic Resin

The ink composition of the present invention comprises an acidic resin. Any suitable polymeric resin having a carboxyl, sulfonic, or phosphonic acid group can be used, with carboxyl group being preferred.

Preferred acidic resins include those having an acid number below about 250, preferably in the range of from about 10 to about 250, and more preferably in the range of from about 50 to about 200. In certain embodiments, the preferred range of acid number is from about 50 to about 80, and in certain other embodiments, the preferred range of acid number is from about 100 to about 180. In some embodiments of the present invention, particularly where the amine density of the polyamine is low, the ink composition can be prepared by the use of an acidic resin having a higher acid number, e.g., an acid number higher than 250.

The acidic resins that can be used to prepare the ink composition of the present invention include organic solvent soluble or organic solvent dispersible resins. Thus, the resin may form a true solution or a colloidal suspension that may be used if filterable without substantial separation through a filter having a pore size substantially smaller than the printer capillary tube, for example through a filter having a pore size of about one micron.

Examples of acidic resins that can be used to prepare the ink composition of the present invention include acrylic resins bearing carboxyl groups. Examples of suitable acrylic resins include the SURCOL™ 836 and 441 resins available from Allied Colloids Co. in Suffolk, Va. The SURCOL 836 resin has an acid number of 63, a number average molecular weight of about 26,000 and a weight average molecular weight of about 46,000. The SURCOL 441 resin has an average molecular weight of about 45,000 and an acid number of about 100. Other examples of such acrylic resins include JONCRYL™ 611, 586, and 683, available from S. C. Johnson Co., in Racine, Wis. JONCRYL 611 has an acid number of 53, JONCRYL 586 has an acid number of 108, and JONCRYL 683 has an acid number of about 160. Yet another example of a suitable acidic acrylic resin is CARBOSET™ 527 available from B. F. Goodrich Specialty Chemicals Co. in Cleveland, Ohio. CARBOSET 527 has an acid number of 80 and a weight average molecular weight of about 40,000. Further examples of suitable acidic acrylic resins are NEOCRYL™ B-817 and B-890, available from Zeneca Resins, Inc., in Wilmington, Del. NEOCRYL B-817 is a copolymer comprising methylmethacrylate and ethylacrylate, and has an acid number of 55 and a weight average molecular weight of about 20,000. NEOCRYL B-890 has an acid number of about 75 and a weight average molecular weight of about 13,000.

The acidic resin can be present in any suitable amount. The acidic resin is preferably present in an amount of from about 3% by weight to about 30% by weight, and more preferably in an amount of from about 7% by weight to about 15% by weight of the ink composition. In some embodiments, the acidic resin can be present in an amount of from about 8% by weight to about 15% by weight of the ink composition.

Binder Resin

The jet ink composition of the present invention can include one or more additional resins. The additional resin is any binder resin known to those skilled in the art. An example of a suitable binder resin is polyurethane, preferably a thermoplastic polyurethane.

The additional resin can be present in an amount of up to 10%, preferably from about 3% by weight to about 8% by weight, and more preferably about 6% by weight, of the ink composition.

Surfactant

The jet ink composition of the present invention can further include a surfactant to optimize the wetting and drying characteristics of the ink. Any suitable surfactant can be employed, for example, fluoroaliphatic polymeric esters and polyalkylene oxide modified polydimethylsiloxanes. Examples of suitable surfactants include SILWET™ L-7622, which is a polyethylene oxide modified polydimethylsiloxane, available from OSi Specialties, Inc. in Danbury, Conn., and FC 430, which is a fluoroaliphatic polymeric ester, available from 3M Co.

The surfactant can be present in the ink composition in any suitable amount, preferably in an amount of up to about 2% by weight, and more preferably in an amount of from about 0.01% by weight to about 1% by weight of the ink composition.

Plasticizer

The jet ink composition of the present invention can also include a plasticizer to improve the durability of the printed message. Any suitable plasticizer can be used. For example, Plasticizer 8, which is an o,p-mixture of N-ethyltoluenesulfonamide available from Monsanto Co., can be used.

The plasticizer can be present in any suitable amount, preferably in an amount of up to about 2% by weight, and more preferably in an amount of from about 0.01% by weight to about 1% by weight of the ink composition.

Humectant

The ink composition of the present invention can preferably include a humectant to prevent drying of the ink on the print head during the printing operation, as well as during storage of the ink. Humectants are hydrophilic solvents having high boiling points, preferably above 100° C., and more preferably in the range of from about 150° C. to about 250° C. Any suitable humectant known to those of ordinary skill in the art can be used. Examples of suitable humectants include glycols such as ethylene glycol, propylene glycol, glycerin, diglycerin, diethylene glycol, and the like, glycol ethers such as ethylene glycol dimethyl ether, ethylene glycol diethylether, propyleneglycol methylether, cellosolve, diethylene glycol monoethylether (Carbitol), diethylene glycol dimethylether, and diethylene glycol diethylether, dialkyl sulfoxides such as dimethyl sulfoxide, and other solvents such as sulfolane, N-methylpyrrolidone, and the like. The humectant can be present in an amount of up to about 5% by weight of the ink composition.

Defoamer

The ink composition of the present invention can further include a defoamer to prevent foaming of the ink during its preparation, as well as during the printing operation. Any suitable defoamer known to those of ordinary skill in the art, for example, polysiloxane defoamers, can be used. An example of a polysiloxane defoamer is BYK™ 065 from BYK-Chemie, in Wallingford, Conn.

The defoamer can be present in the jet ink composition of the present invention in an amount effective to prevent foaming of the jet ink during preparation and use. The defoamer can be present in an amount of from about 0.1% by weight to about 1% by weight, preferably in the range of from about 0.25% by weight to about 0.35% by weight of the ink composition.

Adhesion Promoter

The jet ink composition of the present invention can also include a suitable adhesion promoter, e.g., a silane, to further improve the adhesion of the printed message to glass substrates. An example of a suitable silane is an epoxysilane such as the Silane A-187, available from OSi Specialties, Inc., which is γ-glycidoxypropyl trimethoxysilane. The adhesion promoter can be present in any suitable amount, for example, from about 0.01% by weight to about 1% by weight, and preferably in an amount of from about 0.1% by weight to about 0.2% by weight of the ink composition.

The jet ink composition may further include an electrolyte to adjust its electrical conductivity. Any suitable electrolyte known to those of skill in the art can be used.

The jet ink composition of the present invention can be printed on a variety of glass bottles. Examples of suitable glass bottles include beer bottles, the returnable and the non-returnable varieties. The jet ink composition of the present invention may be jet applied onto a variety of glasses, including soda-lime glasses, borosilicate glasses, alumino-silicate glasses, lead glasses, borate glasses, and the like. The glass containers can contain a coating thereon. Such a surface coating can improve the adhesion of the message to the bottles. Thus, ink compositions whose messages have reduced rub resistance, e.g., as shown by the chamber rub test, can be employed to print on such coated bottles.

The following examples further illustrate the present invention but, of course, should not be construed as in any way limiting its scope.

EXAMPLE 1

This Example illustrates an embodiment of the ink composition of the present invention wherein pentaethylenehexamine was employed as the polyamine and SURCOL 836 as the acidic resin. The following ingredients were employed in the amounts indicated. "IPA" stands for isopropanol.

| Ingredients | Parts |
| --- | --- |
| Methyl ethyl ketone (MEK, Exxon) | 629 |
| Ethanol CDA-19 200 Proof (EMCO Chemical) | 200 |
| Pentaethylenehexamine, 10% in IPA (Aldrich) | 20 |
| SURCOL 836 (Allied Colloids) | 100 |
| ORASOL BLACK RLI (Ciba-Geigy) | 50 |
| FC-430, 10% in MEK (3M) | 1 |
| Total | 1000 |

The ink prepared above was printed on COCA-COLA™ and FANTA™ glass bottles in a 95° F./90% relative humidity environmental chamber. Prior to printing, the bottles were cleaned by washing them with a 3% sodium hydroxide solution in deionized water at 60° C. for 5 minutes followed by rinsing with deionized water. The bottles were then filled with ice water. An air knife was used to remove excessive water drops on the surface of the bottles. Messages were jet printed below the fill line one minute after filling the bottles. Due to the high humidity of the environment and the low temperature of the bottles, a significant amount of moisture condensation occurred on the bottles before as well as after printing.

The following tests were carried out on the printed bottles:

Chamber Rub Test: The printed message was rubbed with the thumb using heavy pressure one minute after printing and the number of rubs needed to remove the message was noted. The messages needed at least 10 rubs to be removed from the glass surface.

Ice Water Test: The bottles were immersed in ice water for a period of at least 16 hours after the messages on the bottles were allowed to dry for at least few hours at ambient conditions. The messages were rubbed with the thumb using heavy pressure. The messages needed 7 rubs to be removed from the glass surface.

Caustic Wash Test: The bottles were allowed to dry in the ambient for at least one hour and then immersed in a bath containing 3% sodium hydroxide at 60° C. for 5 minutes. Due to the wide variety of conditions employed at bottling plants, deionized water was used to make the caustic solution. In fact, most bottle washers use water that has been treated in some manner, for example, to reduce calcium deposits. High levels of water hardness may adversely affect removal of messages that peel. In a majority of cases, the messages were lifted off by the caustic solution. In some cases where the messages were not completely removed by the caustic solution, the bottles were taken out of the caustic bath after the 5-minute immersion and placed in a deionized water bath. These messages were completely removed from the glass surface by the water bath.

EXAMPLE 2

This Example illustrates another embodiment ink composition of the present invention. Here pentaethylenehexamine was employed as the polyamine and SURCOL 836 as the acidic resin. The following ingredients were employed in the amounts indicated.

| Ingredients | Parts |
| --- | --- |
| Methyl ethyl ketone (Exxon) | 748 |
| Ethanol CDA-19 200 Proof (EMCO Chemical) | 90 |
| Pentaethylenehexamine, 10% in IPA (Aldrich) | 20 |
| SURCOL 836 (Allied Colloids) | 80 |
| ORASOL BLACK RLI (Ciba-Geigy) | 40 |
| Plasticizer 8 (Monsanto) | 10 |
| FC-430, 10% in MEK (3M) | 10 |
| BYK 065 (BYK-Chemie) | 2 |
| Total | 1000 |

The glass bottles were jet printed and the printed messages were tested as set forth in Example 1. The messages had good rub resistance and passed the caustic wash test. In the chamber rub test as well as the ice water test, the messages needed more than 10 rubs to be removed.

EXAMPLE 3

This Example illustrates yet another embodiment ink composition of the present invention. Here, STARBURST generation 2 was employed as the polyamine and SURCOL 836 as the acidic resin. The following ingredients were employed in the amounts indicated.

| Ingredients | Parts |
| --- | --- |
| Methyl ethyl ketone (Exxon) | 763 |
| Ethanol CDA-19 200 Proof (EMCO Chemical) | 90 |
| STARBURST Generation 2, 49.51% in methanol (Dendritech) | 5 |
| SURCOL 836 (Allied Colloids) | 80 |
| ORASOL BLACK RLI (Ciba-Geigy) | 40 |
| Plasticizer 8 (Monsanto) | 10 |
| EC-430, 10% in MEK (3M) | 10 |
| BYK 065 (BYK-Chemie) | 2 |
| Total | 1000 |

The glass bottles were jet printed and the printed messages were tested as set forth in Example 1. The messages had good rub resistance and passed the caustic wash test. In the chamber rub test as well as the ice water test, the messages needed more than 10 rubs to be removed.

EXAMPLE 4

This Example illustrates still another embodiment ink composition of the present invention. Here, a methyl methacrylate/dimethylaminoethyl methacrylate copolymer was employed as the polyamine and SURCOL 836 as the acidic resin. The following ingredients were employed in the amounts indicated.

| Ingredients | Parts |
| --- | --- |
| Methyl ethyl ketone (Exxon) | 742 |
| Ethanol CDA-19 200 Proof (EMCO Chemical) | 100 |
| Methyl methacrylate/dimethylaminoethyl methacrylate (70/30) copolymer, 35.5% in MEK | 16 |
| SURCOL 836 (Allied Colloids) | 80 |
| ORASOL BLACK RLI (Ciba-Geigy) | 40 |
| Plasticizer 8 (Monsanto) | 10 |
| FC-430, 10% in MEK (3M) | 10 |
| BYK 065 (BYK-Chemie) | 2 |
| Total | 1000 |

The glass bottles were jet printed and the printed messages were tested as set forth in Example 1. The messages had good rub resistance and passed the caustic wash test. In the chamber rub test as well as the ice water test, the messages needed more than 10 rubs to be removed.

EXAMPLE 5

This example illustrates an additional embodiment ink composition of the present invention wherein a methyl methacrylate/dimethylaminoethyl methacrylate copolymer was employed as the polyamine and JONCRYL 683 as the acidic resin. The following ingredients were employed in the amounts indicated.

| Ingredients | Parts |
| --- | --- |
| Methyl ethyl ketone (Exxon) | 584 |
| Ethanol CDA-19 200 Proof (EMCO Chemical) | 194 |
| N-Methylpyrrolidone (ISP) | 30 |
| JONCRYL 683 (S.C. Johnson) | 125 |
| Methyl methacrylate/dimethylaminoethyl methacrylate (70/30) copolymer, 35.5% in MEK | 12.5 |
| Silane A-187 (OSi) | 2 |
| BYK-065 (BYK-Chemie) | 2 |
| SILWET L-7622 (OSi) | 0.5 |
| ORASOL BLACK RLI (Ciba-Geigy) | 5 |
| Total | 1000 |

The glass bottles were jet printed and the printed messages were tested as set forth in Example 1, except that the environmental chamber was set at 90° F. and 90% relative humidity. The messages passed the caustic wash test as well as the ice water test. The messages did not rub off even after 10 rubs in the ice water test. The messages were dissolved in less than 10 seconds in the caustic wash test. As opposed to messages that peel in caustic, dissolution of ink jet messages of this ink composition was not affected by the hardness of the water used to make the caustic. In the chamber rub test, the messages were rubbed off in 7 rubs.

The present invention provides a jet ink composition wherein methyl ethyl ketone is present in an amount of from about 30% by weight to about 80% by weight of the ink composition, ethanol is present in an amount of up to about 50% by weight of the ink composition, a polyamine is present in an amount of from about 0.1% by weight to about 0.5% by weight of the ink composition, an acidic resin is present in an amount of from about 3% by weight to about 20% by weight of the ink composition, a dye is present in an amount of from about 3% by weight to about 6% by weight of the ink composition, a surfactant is present in an amount of from about 0.01% by weight to about 1% by weight of the ink composition, and a humectant is present in an amount of up to about 5% by weight of the ink composition.

The present invention further provides an improved process for jet printing on glass surfaces messages having resistance to water comprising directing a stream of ink droplets to the surface and controlling the direction of the droplets so as to form the messages, the improvement comprising directing a jet ink composition of the present invention.

All references, including patents and publications, cited herein are hereby incorporated in their entirety by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. A jet ink composition comprising an organic solvent, a colorant, a polyamine, and an acidic resin having an acid number of from about 50 to less than 100.

2. The jet ink composition of claim 1, wherein said composition has a viscosity of from about 1.5 centipoises (cps) to about 7 cps at 25° C., an electrical resistivity of from about 50 ohm-cm to about 2000 ohm-cm, and a sonic velocity of from about 1100 meters/second to about 1700 meters/second.

3. The jet ink composition of claim 2, wherein said colorant is a dye.

4. The jet ink composition of claim 3, wherein said organic solvent is selected from the group consisting of ketones, alcohols, and combinations thereof.

5. The jet ink composition of claim 4, wherein said acidic resin has an acid number of from about 50 to about 80.

6. The jet ink composition of claim 5, wherein said polyamine is selected from the group consisting of pentaethylenehexamine, dendrimers of generations 0, 1, and 2, and copolymers of methylmethacrylate and dimethylaminoethylmethacrylate.

7. The jet ink composition of claim 6, wherein said acidic resin is a carboxylated acrylic polymer.

8. The jet ink composition of claim 7, wherein said dye is Solvent Black 29.

9. The jet ink composition of claim 8, which further includes a surfactant.

10. The jet ink composition of claim 9, which further includes a humectant.

11. The jet ink composition of claim 10, wherein said organic solvent is selected from the group consisting of methyl ethyl ketone, ethanol, and combinations thereof.

12. The jet ink composition of claim 11, wherein said methyl ethyl ketone is present in an amount of from about 30% by weight to about 80% by weight of the ink composition, said ethanol is present in an amount of up to about 50% by weight of the ink composition, said polyamine is present in an amount of from about 0.1% by weight to about 0.5% by weight of the ink composition, said acidic resin is present in an amount of from about 3% by weight to about 20% by weight of the ink composition, said dye is present in an amount of from about 3% by weight to about 6% by weight of the ink composition, said surfactant is present in an amount of from about 0.01% by weight to about 1% by weight of the ink composition, and said humectant is present in an amount of up to about 5% by weight of the ink composition.

13. The jet ink composition of claim 1, wherein said polyamine is selected from the group consisting of pentaethylenehexamine, dendrimers of generations 0, 1, and 2, and copolymers of methylmethacrylate and dimethylaminoethylmethacrylate.

14. In an improved process for jet printing on glass surfaces messages having resistance to water comprising directing a stream of ink droplets to said surface and controlling the direction of said droplets so as to form the messages, the improvement comprising directing a stream of droplets of the jet ink composition of claim 1.

15. A jet ink composition comprising an organic solvent, a colorant, an acidic resin having an acid number of from about 50 to less than 100, and a polyamine selected from the group consisting of a polyalkyleneamine, an aminoacrylic polymer, and a dendrimer.

16. The jet ink composition of claim 15, wherein said organic solvent comprises a mixture of a lower ketone, a lower alcohol, and an amide.

17. The jet ink composition of claim 16, wherein said acidic resin has an acid number of about 80.

18. The jet ink composition of claim 16, wherein said organic solvent comprises a mixture of methyl ethyl ketone, ethanol, and N-methylpyrrolidone.

19. The jet ink composition of claim 18, wherein methyl ethyl ketone is present in an amount of from about 50% by weight to about 70% by weight, ethanol is present in an amount of from about 5% by weight to about 25% by weight, and N-methylpyrrolidone is present in an amount of about 3% by weight of the ink composition.

20. The jet ink composition of claim 16, further including a silane adhesion promoter.

* * * * *